April 19, 1938.    F. G. THWAITS    2,114,822
VEHICULAR TANK SUPPORT
Filed Oct. 3, 1936    3 Sheets-Sheet 2

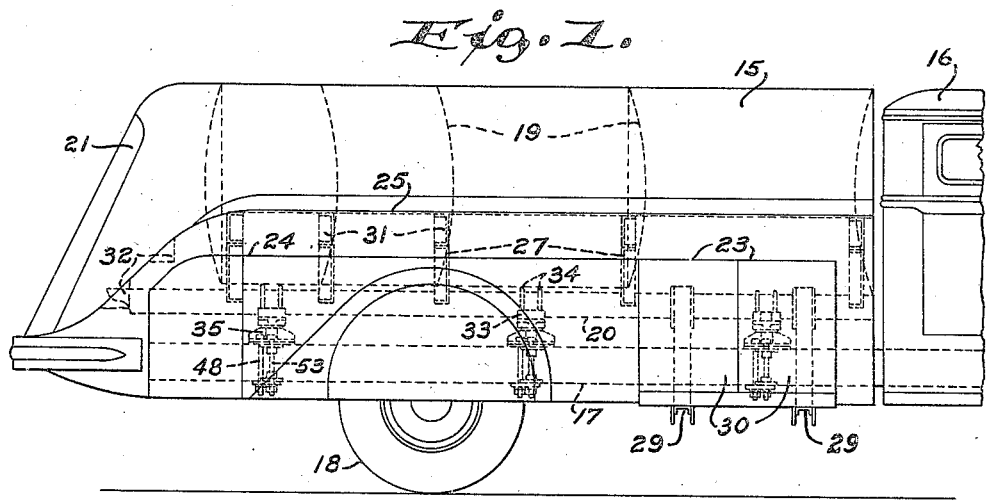
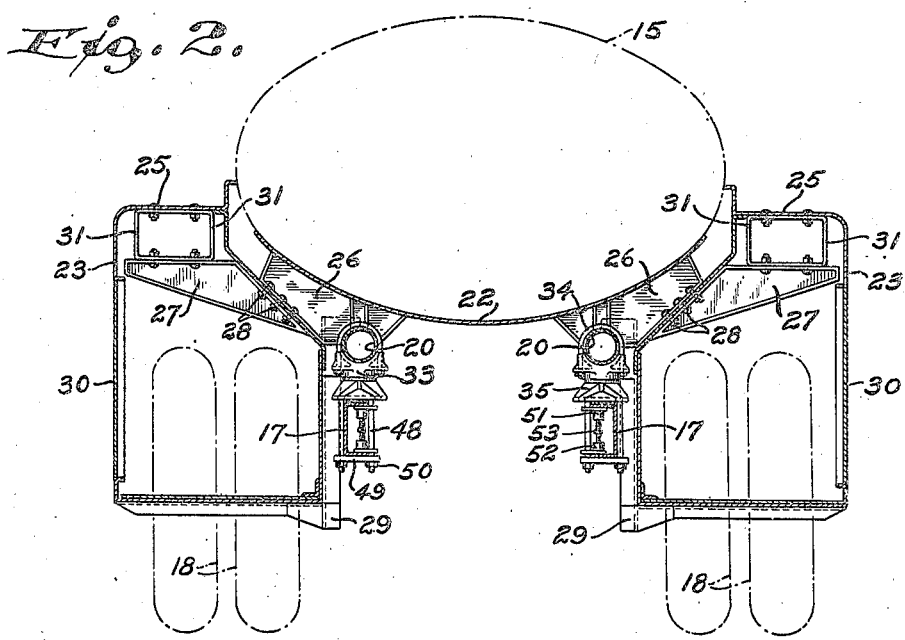
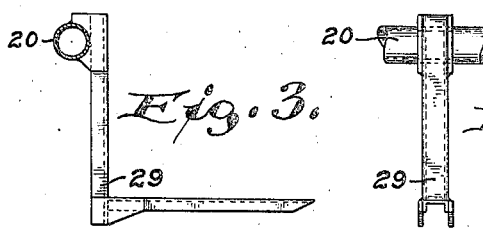

INVENTOR.
F. G. Thwaits
BY Morsell, Lieber & Morsell
ATTORNEYS.

April 19, 1938.  F. G. THWAITS  2,114,822
VEHICULAR TANK SUPPORT
Filed Oct. 3, 1936  3 Sheets-Sheet 3
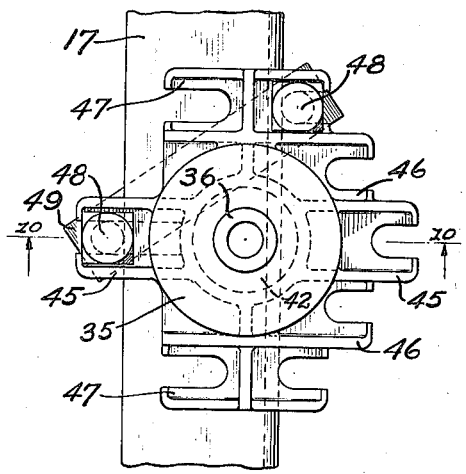
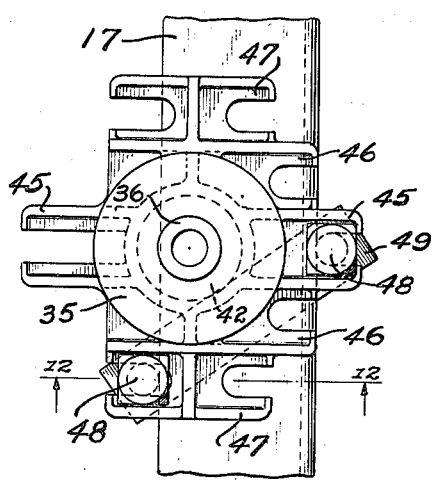
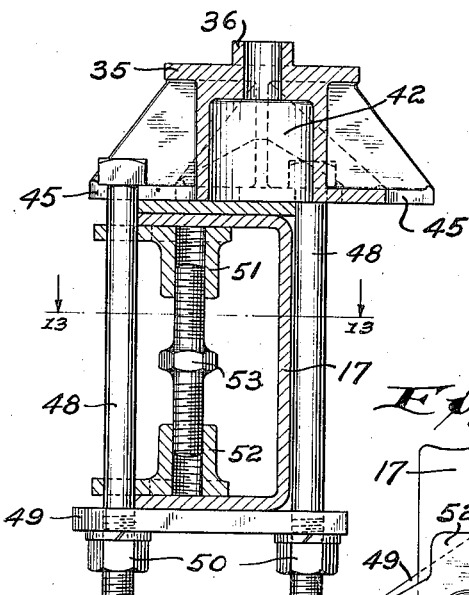
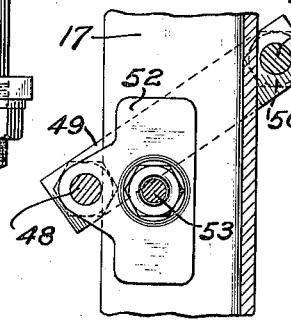
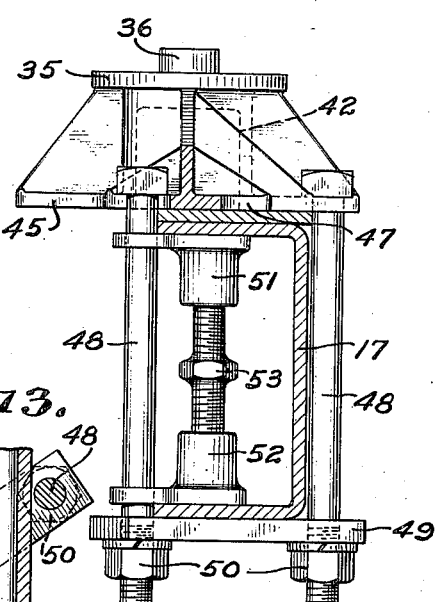
INVENTOR.
F. G. Thwaits
BY Morsell, Lieber & Morsell
ATTORNEYS.

Patented Apr. 19, 1938

2,114,822

UNITED STATES PATENT OFFICE 2,114,822

VEHICULAR TANK SUPPORT

Frederick G. Thwaits, Wauwatosa, Wis., assignor to The Heil Co., Milwaukee, Wis., a corporation of Wisconsin Application October 3, 1936, Serial No. 103,886

14 Claims. (Cl. 280—5)

My present invention relates generally to improvements in the manufacture of vehicles for transporting materials in bulk, and relates more specifically to various improvements in the construction of mountings for supporting a tank and other receptacles upon the chassis of a truck or similar vehicle.

Generally defined, an object of the present invention is to provide an improved vehicular tank and side compartment mounting, which is simple and durable in construction, and which is moreover highly effective in use.

The manufacturers of vehicular tanks for transporting liquid in bulk, have heretofore been confronted with many difficulties in attempting to provide simple and durable mountings for tanks of various sizes and shapes, which mountings would be adapted to effectively cooperate with trucks having chassis beams of varied shapes surrounded by various kinds of obstructions and spaced apart different distances. Such tanks must be firmly attached to the chassis in order to avoid relative shifting of the tank and vehicle especially when the former is loaded, but the mounting must be sufficiently flexible or resilient to prevent transmission of shock from the chassis to the relatively thin tank shell. Tanks of this type are also frequently provided with auxiliary storage compartments and running boards at their opposite sides, and the matter of properly suspending these compartments and running boards has also presented relatively complex problems in the past. While it has heretofore been customary to especially design a suitable tank mounting and auxiliary compartment support for each type of tank and truck chassis, this prior method of meeting the problem has been too costly and did not permit desirable standardization, and the prior compartment supports did not exclude water and moreover undesirably restricted the available storage capacity of the compartments.

It is therefore an object of the present invention to provide a new and useful tank mounting which is adapted to effectively cooperate with tanks and vehicles of various types, and to also provide a simple and effective side compartment support which will insure maximum storage space sealed against ingress of rain or the like.

Another specific object of my present invention is the provision of an improved resilient support for an elongated vehicular tank or the like, which may be conveniently adjusted so as to most effectively cooperate with the tank and with the chassis beams regardless of obstructions disposed near the latter.

A further specific object of this invention is the provision of an improved side compartment and running board mounting which will not interfere with the support for the intervening tank, and which will moreover permit location of the running boards at any desired level.

Still another specific object of the present invention is to provide various improvements in the details of construction of vehicular tank mountings of the type generally disclosed in prior Patent No. 2,008,858, granted July 23, 1935, but which are more generally applicable to tank vehicles so as to reduce to a minimum the cost of construction thereof and which will greatly facilitate the attachment of the tanks and side compartments to the vehicle proper.

These and other specific objects and advantages will be apparent from the following detailed description.

A clear conception of the various features constituting the present improvement, and of the mode of constructing and of using mountings built in accordance with the invention, may be had by referring to the drawings accompanying and forming a part of this specification wherein like reference characters designate the same or similar parts in the various views:

Fig. 1 is a side view of the rear portion of a truck tank, showing generally the improved mode of mounting the tank and side compartments upon the truck chassis;

Fig. 2 is an enlarged transverse vertical section through the tank and side compartment supports, showing the tank and rear wheels in dot-and-dash lines;

Fig. 3 is a rear view of one of the side compartment supporting brackets;

Fig. 4 is a side view of the supporting bracket of Fig. 3;

Fig. 9 is a view similar to that of Fig. 8, showing the lower support offset outwardly with respect to the adjacent chassis beam;

Fig. 10 is a transverse vertical section through the assemblage of Fig. 9, taken along the line 10—10;

Fig. 11 is another view similar to that of Fig. 8, showing the lower support offset inwardly with respect to the adjacent chassis beam;

Fig. 12 is a transverse vertical section through the assemblage as shown in Fig. 11, taken along the line 12—12 of Fig. 11; and Fig. 13 is a horizontal section through Fig. 10 taken along the line 13—13.

Figure 8:
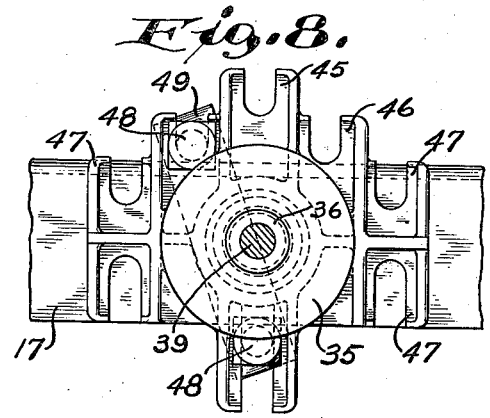
Fig. 8 is a horizontal section through the mounting structure of Figs. 5 to 7 inclusive, taken along the line 8—8 of Fig. 5 but showing the lower support in full.
Figure 7:
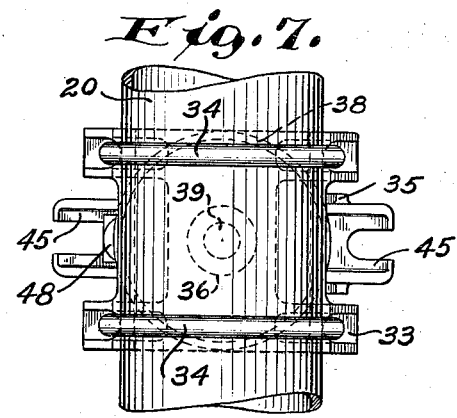
Fig. 7 is a top view of the mounting shown in Figs. 5 and 6.
Figure 5:
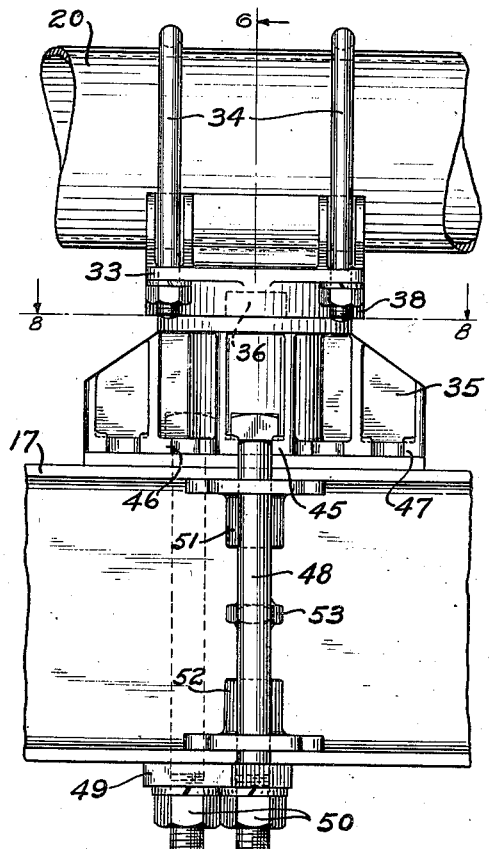
Fig. 5 is a further enlarged side elevation of one of the tank and compartment mountings showing the same applied directly over and in line with one of the chassis beams.
Figure 6:
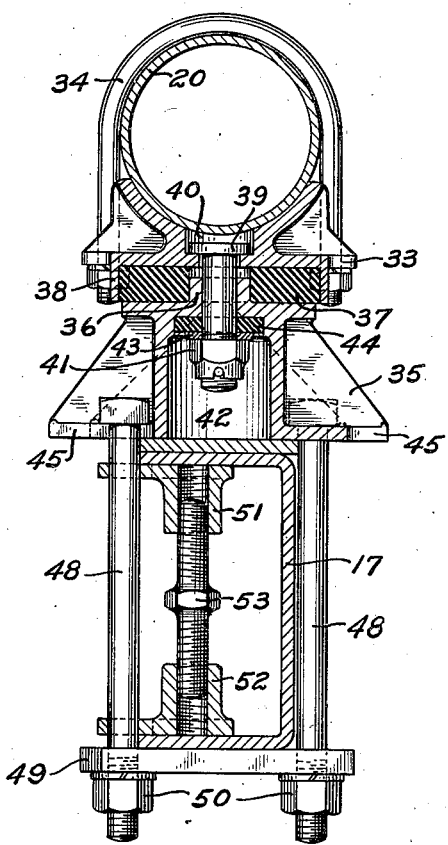
Fig. 6 is a transverse vertical section through the assemblage of Fig. 5, taken along the line 6—6.

While the invention has been shown and described herein as being applied to an assemblage including an elliptical sectioned liquid transporting tank and barrel carrier compartments located at the opposite sides of the tank, it is not the intent to thereby unnecessarily restrict the scope or field of adaptation of the improved features.

Referring especially to Figs. 1 and 2 of the drawings, the tank vehicle shown therein comprises in general an elongated sheet metal tank 15 having either elliptical or any other desired transverse cross-section; and a transporting truck having a driver's cab 16 and channel-shaped parallel chassis beams 17 upon which the tank 15 is mounted rearwardly of the cab 16. The vehicle or truck is of relatively conventional construction, the chassis beams 17 being supported upon wheels 18 in a well known manner; and these beams normally being located closely adjacent to numerous obstructions such as springs and driving mechanism thereby making only local portions of the beams 17 available for attachment of the tank 15 thereto. The truck is ordinarily provided with a propelling motor mounted upon the chassis in front of the cab 16, and adapted to drive the wheels 18 in the usual manner.

The elongated sheet metal tank 15 may be formed of separable compartments, or it may have a unitary outer shell which may be divided into segregated compartments by means of internal partitions 19 as indicated in Fig. 1; and this tank is also provided with the usual manhole openings at the top and with liquid dispensing piping at the bottom usually located between the chassis beams 17. Disposed between the bottom of the tank 15 and the top of the chassis beams 17, are two parallel tubular beam members 20, the rear open ends of which are ordinarily accessible through a rear storage compartment 21 for insertion or removal of service hose, and which constitute the main supporting beams for the tank supporting saddle 22 and for opposite side auxiliary compartments 23, 24 and running boards 25 disposed at the sides of the tank 15, as clearly illustrated in Figs. 1 and 2. The saddle 22 is formed to snugly engage the bottom of the tank 15 which may be either detachably secured to the saddle by means of releasable clamping straps, or welded directly thereto, or otherwise firmly attached; and the saddle 22 is provided with depending supporting struts 26 which coact with and may be rigidly attached to the tubular beam members 20, preferably adjacent each partition 19 and adjacent the tank ends, by welding or otherwise. These struts 26 definitely fix the location of the supporting beam members 20 relative to the saddle 22 and tank 15, and they are provided with inclined outwardly projecting lower faces to which the auxiliary compartments 23, 24 and the running board supporting brackets 27 may be rigidly secured by means of bolts or rivets 28 as depicted in Fig. 2.

The side compartments 23, 24 may be formed of sheet metal and are preferably of sufficient size to receive and to conceal barrels, cans or the like, and these auxiliary compartments are suspended directly from the beam members 20 by means of angle brackets 29 in addition to being secured to the struts 26 as previously indicated. The angle brackets 29 may be welded directly to the members 20 as shown in Figs. 3 and 4, and such brackets may be provided wherever necessary; and the auxiliary compartments 23 are located in front of the wheels 18 while the compartments 24 are disposed behind these wheels. The side compartments 23, 24 may be provided with suitable closure doors 30; and the brackets 27 which are concealed within these compartments, form supports for spacing elements 31 which provide direct supports for the running boards 25. The running boards 25 extend horizontally along the opposite sides of the tank 15, and the elevation of these running boards may be determined by a desired selection of spacing elements 31 of different heights. The rear ends of the running boards may connect with stairs 32 leading to the lower rear end of the rear compartment 21 in a well-known manner, and these stairs cooperate with the sloping rear end of the compartment 21 to produce a highly streamlined appearance. The tank 15, saddles 22, compartments 21, 23, 24, and running boards 25 are thus rigidly attached to the tubular beam members 20 to produce a single composite unit capable of being handled as such for installation purposes; and obviously the sizes and shapes of the tank and side compartments, and the location of the running boards and beam members may be varied to suit different conditions.

The tubular beam members 20 are adapted to be mounted upon the chassis beams 17 with the aid of the improved mountings shown in Figs. 5 to 13 inclusive, and each of these mountings comprises generally an upper saddle block 33 coacting with the bottom of the adjacent member 20 and clamped thereto by means of a pair of U-bolts 34; a lower support 35 adapted to rest either directly or through a bearing plate upon the adjacent chassis beam 17 and having a central upwardly extending hollow boss 36; a resilient annular buffer block 37 snugly embracing the boss 36 and coacting with the top of the support 35 and with the bottom of the block 33 within an annular depending flange 38 formed integral with the latter; and a central vertical connecting bolt 39 extending through the boss 36 and coacting with the block 33 and support 35 to confine the block 37 in place. The resilient block 37 may be formed of rubber or the like, and the head of the clamping bolt 39 is confined within a recess 40 in the saddle block 33 while the clamping nut 41 coacting with the bolt 39 is confined within a central recess 42 in the corresponding support 35 and coacts with a washer 43 which in turn coacts with a resilient washer 44 directly engaging the support 35. The base of the support 35 is provided with a series of variably notched ears 45, 46, 47, of which the central ears 45 project outwardly to a greater extent than the intermediate ears 46, whereas the latter extend outwardly farther than the end ears 47. A set of clamping bolts 48 is adapted to coact with selected ears 45, 46, 47 of the support 35, and with a clamping bar 49 coacting with the bottom of the adjacent chassis beam 17 through clamping nuts 50 and lock washers, as shown. In order to reenforce the chassis beam 17 at each mounting, a jack is applied between the horizontal beam flanges, and each of these jacks has upper and lower blocks 51, 52 respectively, and an intervening jack screw 53. The blocks 51, 52 have outwardly extending integral flanges 54 provided with holes which are adapted to be pierced by the bolts 48 in order to retain each jack in proper position within the adjacent chassis beam 17.

During normal use of the improvement, the tank 15 after being completed, may be firmly mounted upon the saddle 22 after the latter has been assembled and secured to the tubular beam members 20, either before or after the auxiliary compartments 23, 24 and the running boards 25 have been applied. The brackets 27, 29 which are initially rigidly associated with the members 20 then effectively support the compartments 23, 24, and by selecting spacers 31 of suitable height, the running boards 25 may be firmly supported at any desired elevation on opposite sides of the tank. The assembled saddle 22 and tubular members 20, together with the tank 15 and compartments 23, 24 if these are permanently applied, may thereafter be handled as a unit for attachment to the vehicle. The saddle blocks 33 may be initially loosely attached to the members 20 with the aid of the U-bolts 34, and the lower supports 35 may likewise be loosely initially suspended from the blocks 33 by means of the bolts 39. The loosely assembled mountings may then be brought into approximate position with respect to the chassis beams 17, and thereafter adjusted to perfect coaction and subsequently firmly clamped in position. Depending upon the relative disposition of the chassis beams 17, the lower supports 35 may be positioned either as shown in Figs. 8, 9, or 11, and the clamping bolts 48 and bars 49 may be finally applied together with the reenforcing jacks, to firmly and finally lock the supports 35 in place with the bolts 48 located as close as possible to the beams 17. The variably notched ears 45, 46, 47 formed on the lower supports 35 will obviously permit effective clamping with the bars 49 preferably disposed at an angle to the beams 17 so as to secure maximum clamping area and to prevent possible displacement of the supports 35, and the jack screws 53 may be readily adjusted to augment the clamping effect and to reenforce the channel beams 17. The improvement thus provides an effective mounting and attachment cooperable with chassis beams spaced different distances apart, and the assemblage may obviously be readily handled and applied to trucks of various types. By virtue of the adjustability of the mountings afforded by the supports 35 and blocks 33, relative to the tubular members 20, these mountings may be disposed so as to avoid interfering with obstructions which may be located near the chassis beams 17, and this adjustability also permits standardization of the mounting for various types of tank trucks.

From the foregoing description it will be apparent that the present invention provides an improved mounting for vehicular tanks and auxiliary compartments, which is simple, compact and durable in construction, and which may moreover be conveniently applied to various classes of truck tank assemblages. With the improved mounting, the supports may be most effectively located so as to insure proper mounting of the tank regardless of its shape, and the resilient buffer blocks 37 and the washers 44 function to absorb shock which might otherwise be transmitted from the beams 17 to the tank 15. When auxiliary compartments 23, 24 and running boards 25 are utilized, the present improvement provides simple and effective instrumentalities for suspending such accessories without subjecting the tank 15 to undesirable stress. The compartments may also be maintained water tight so as to prevent ingress of rain, and the improvement makes maximum capacity available in these side compartments for storage purposes. The running boards 25 may also be disposed at any desired elevation, and the entire assemblage is especially adapted to insure obtaining of maximum streamlined effect in the external appearance of the assembled vehicular tank. The use of tubular beams 20 is preferable because of the added strength and the hose storage space made available thereby. The invention has proven extremely practical in actual commercial use and greatly facilitates the manufacture and assemblage of truck tanks without sacrificing durability.

It should be understood that it is not desired to limit the present invention to the exact details of construction and to the precise mode of assembling tank mountings, as herein shown and described, for various modifications within the scope of the claims may occur to persons skilled in the art.

I claim:—

1. In combination, a pair of laterally spaced tubular beams, a saddle rigidly connecting said beams, a tank secured to said saddle, brackets secured to said beams independently of said saddle, and side compartments mounted upon said brackets, said side compartments also being secured directly to said saddle and the tops of said compartments providing running boards on opposite sides of said tank.

2. In combination, a pair of laterally spaced parallel beams, a saddle rigidly connecting said beams, a tank supported by said saddle, side compartments secured to said saddle, the tops of said side compartments providing running boards on opposite sides of said tank, brackets secured to said saddle and extending into said compartments beneath said running boards, and spacers interposed between said brackets and said running boards.

3. In combination, a pair of laterally spaced parallel beams, a saddle rigidly connecting said beams, a tank supported by said saddle, side compartments secured to said saddle, the tops of said side compartments providing running boards on opposite sides of said tank, brackets secured to said saddle and extending into said compartments beneath said running boards, spacers interposed between said brackets and said running boards, and common means for attaching said brackets and said compartments directly to said saddle.

4. In combination, a pair of laterally spaced beams, a saddle rigidly connecting said beams, a tank supported upon said saddle, side compartments secured to said saddle, supporting brackets for said compartments secured directly to said beams, other brackets secured to said saddle and extending into said compartments, and spacers interposed between said other brackets and the tops of said compartments, said compartment tops being located above the top of said saddle on opposite sides of said tank.

5. In combination, a pair of laterally spaced beams, a saddle mounted upon and rigidly interconnecting said beams, a tank supported by said saddle, side compartments suspended from said beams, mounting blocks coacting with said beams for adjustment therealong, and supports for said mounting blocks angularly adjustably attached thereto, said blocks and said supports providing mountings for said beams located between said compartments.

6. In combination, a pair of parallel tubular beams, a tank supported by said beams, chassis beams disposed beneath said tubular beams, mounting blocks coacting directly with said tubular beams, supports coacting directly with said chassis beam, a pivotal connection between each of said mounting blocks and the complementary support, and a resilient block interposed between each support and the adjacent mounting block.

7. In combination, a pair of parallel tubular beams, a tank supported by said beams, chassis beams disposed beneath said tubular beams, mounting blocks coacting directly with said tubular beams, supports coacting directly with said chassis beam, a pivotal connection between each of said mounting blocks and the complementary support, and a resilient block interposed between each support and the adjacent mounting block, said resilient blocks surrounding said pivotal connections.

8. In combination, a pair of upper beams, a tank supported by said beams, chassis beams disposed beneath said upper beams, mounting blocks secured to said upper beams, resilient blocks coacting with said mounting blocks, and supports coacting with said resilient blocks and with said chassis beams, said supports being adjustably attached to both said mounting blocks and said chassis beams.

9. In combination, a pair of tubular beams, a tank mounted upon said beams, chassis beams of channel shape disposed beneath said tubular beams, resilient mountings interposed between said tubular beams and said chassis beams, and a jack screw coacting with said chassis beams adjacent to each of said mountings.

10. In combination, an elongated tank, supporting beams disposed beneath said tank and extending longitudinally thereof, chassis beams disposed beneath said supporting beams, intervening mountings interposed between said supporting beams and said chassis beams, said mountings having ears of different lengths coacting with said chassis beams, and attaching bolts for said mountings coacting with said ears and located closely adjacent to said chassis beams.

11. In combination, an elongated tank, supporting beams disposed beneath said tank and extending longitudinally thereof, chassis beams disposed beneath said supporting beams, intervening mountings interposed between said supporting beams and said chassis beams, said mountings having ears of different lengths coacting with said chassis beams, attaching bolts for said mountings coacting with said ears and located closely adjacent to said chassis beams, and clamping bars coacting with said bolts and with the lower faces of said chassis beams, said bars being disposed diagonally across said lower faces.

12. In combination, a tank, channel shaped chassis beams disposed beneath said tank, mountings for said tank resting upon the upper flanges of said chassis beams, clamping bars for said mountings coacting with the lower flanges of said chassis beams, and jack screws interposed between said beam flanges adjacent to said mountings.

13. In combination, a tank, channel shaped chassis beams disposed beneath said tank, mountings for said tank resting upon the upper flanges of said chassis beams, clamping bars for said mountings coacting with the lower flanges of said chassis beams, jack screws interposed between said beam flanges adjacent to said mountings, and clamping bolts connecting said mountings and said bars, said bolts coacting with said jacks to prevent displacement thereof.

14. In combination, an elongated tank, chassis beams having superimposed flanges the upper of which support said tank, mountings interposed between said tank and said upper beam flanges, said mountings having side notches of different depths disposed in series along said beams, and clamping bolts for said mountings coacting with selected notches of each series to position said bolts closely adjacent the edges of said beam flanges regardless of the lateral spacing thereof.

FREDERICK G. THWAITS.